United States Patent
Walker et al.

(10) Patent No.: US 6,615,478 B2
(45) Date of Patent: Sep. 9, 2003

(54) PROCESS FOR ASSEMBLING A VEHICLE CHASSIS BY INVERSION

(75) Inventors: Bradley P. Walker, Richardson, TX (US); Christopher Lee Keeton, Springfield, OH (US); Robert C. Thomas, Springfield, OH (US); Paul L. LaVelle, Springfield, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/346,996

(22) Filed: Jan. 17, 2003

(65) Prior Publication Data

US 2003/0106202 A1 Jun. 12, 2003

Related U.S. Application Data

(62) Division of application No. 09/941,234, filed on Aug. 28, 2001.
(60) Provisional application No. 06/229,713, filed on Aug. 31, 2000.

(51) Int. Cl.$^7$ .................................................. B23Q 1/04
(52) U.S. Cl. ........................................ 29/559; 29/281.4
(58) Field of Search ............................ 414/744.1, 744.2, 414/744.6, 744.8, 744.5; 29/559, 281.4; 269/58, 71, 25

(56) References Cited

U.S. PATENT DOCUMENTS

| | | | | |
|---|---|---|---|---|
| 3,930,643 A | * | 1/1976 | Moore | 269/58 |
| 4,392,776 A | * | 7/1983 | Shum | 414/744.5 |
| 5,316,277 A | * | 5/1994 | Banks | 269/25 |

* cited by examiner

*Primary Examiner*—Robert C. Watson
(74) *Attorney, Agent, or Firm*—Jeffrey P. Calfa; Neil T. Powell; Dennis Kelly Sullivan

(57) ABSTRACT

A chassis inverter consisting of a set of clamps that hold a mobile vehicle chassis and a hydraulic driven rotary actuator. The apparatus and an overhead crane system provide a method of inverting and transferring chassis in a short time period needed to meet high volume vehicle manufacturing needs. The apparatus consists of two c-shaped clamps that cradle the chassis. The clamps are assembled to a shaft that is driven by a hydraulic cylinder through a sprocket and chain arrangement that provides a full inversion of the chassis. One clamp has a motorized trolley that provides adjustment needed for handling chassis of widely varying wheelbase. The process involves an overhead crane system with a bridge crane section that provides the necessary broadside loading motion, and an interlocking monorail section that allows the hoist carriers to exit the bridge and travel perpendicularly to the inverting apparatus' loading direction.

2 Claims, 5 Drawing Sheets

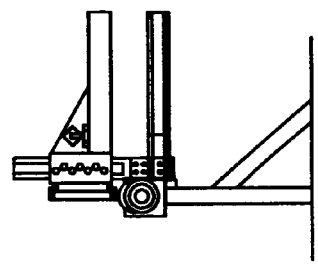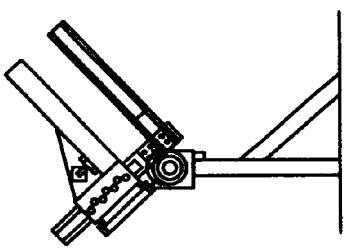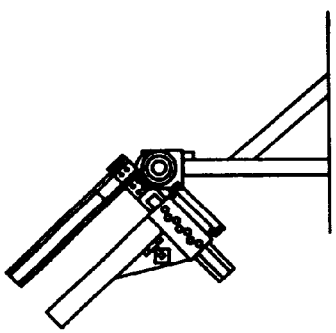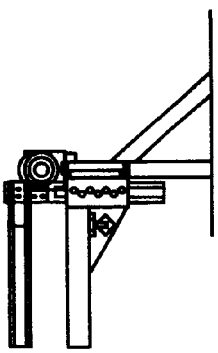

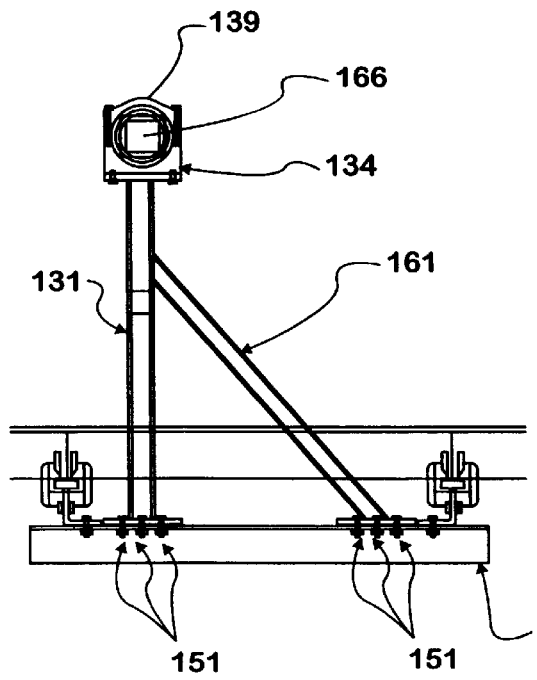
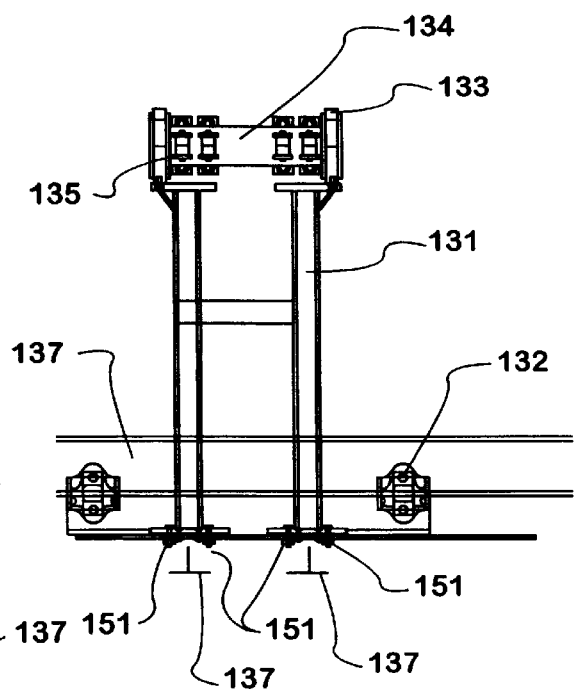
FIG. 4
FIG. 5

PROCESS FOR ASSEMBLING A VEHICLE CHASSIS BY INVERSION

This is a division of application Ser. No. 09/941,234, filed Aug. 28, 2001.

This is a non-provisional patent application claiming the priority of provisional patent application Ser. No. 60/229,713, filed Aug. 31, 2000.

BACKGROUND

This invention relates to an apparatus and method for inverting a chassis of a mobile vehicle to facilitate the assembly of components on the underside of the vehicle. This would include the installation of vehicle suspensions and axles and related components. The invention has applicability in the assembly of medium and heavy-duty trucks in addition to other mobile vehicles to which components are installed on the underside of the chassis.

PRIOR ART

Assembly of mobile vehicles sometimes requires installation of components on the underside of or underneath the vehicle chassis. Some components that are installed on the underside of chassis include vehicle suspension systems, axles and accompanying components, such as brakes, wheels, and sometimes drive train components. One conventional method of installation of these underside components involves assembling these components from underneath. This is cumbersome especially for large vehicle chassis. Another method involves hoisting the chassis in the air and then inverting from above while in the air. The chassis is then lowered, components installed. In some cases, the chassis is re-inverted following the installation. There are always safety concerns lifting vehicles weighing thousands of pounds in the air and inverting them. At least one prior art patent, U.S. Pat. No. 3,670,903 involved a component inverter that pivoted off the floor, with the center of gravity of the component remained over the pivot point. The problem there being that the mass of the component to be flipped had to be shifted perpendicular to the length of the inversion axis in a horizontal direction when the chassis was off the work floor. The horizontal shift would be difficult for a large multi-ton vehicle chassis due to the support requirements during the shift. This patent as well as others in the prior art does not address the application of vehicle chassis manufacture or maintenance. One specific issue with truck chassis inversion is that some vehicle wheelbases, and hence axial weight distributions on the same assembly line may be different. None of the prior art adjusts for vehicle wheel base variations. The problem here is that there may be an uneven load distribution if the separation of support elements cannot be varied. This could result in undesirable shifting of the chassis while elevated.

What is needed and does not exist in the prior art is a chassis inverter and process that uses this inverter that pivots a large chassis from the work floor and does not require horizontal mass shifts while the chassis is in the air and that varies lifting axially locations to account for varying vehicle wheelbases and axial weight distribution.

SUMMARY

An object of the invention is to provide is a chassis inverter and process that uses this inverter that pivots a large chassis from the work floor and does not require horizontal mass shifts while the chassis is in the air. An additional object is to provide a chassis inverter that may invert vehicles with varying wheelbases while maintaining even load distribution.

The chassis inverter and process to use the inverter of this invention satisfies these objectives as well as some not mentioned. The chassis inverter consists of a set of clamps that hold the vehicle chassis and a hydraulic driven rotary actuator. The apparatus and an overhead crane system provide a method of inverting and transferring chassis in the short time period needed to meet high volume vehicle manufacturing needs.

The apparatus consists of two c-shaped clamps that cradle the chassis. The clamps are assembled to a shaft may be driven by a hydraulic cylinder through a sprocket and chain arrangement that provides a full 180-degree rotation of the chassis. One clamp may have motorized trolley that provides adjustment needed for handling chassis of widely varying wheelbase.

The process involves an overhead crane system with a bridge crane section may provide the necessary broadside loading motion, and an interlocking monorail section that allows the hoist carriers to exit the bridge and travel perpendicularly to the inverting apparatus' loading direction. The chassis is then transferred to a next assembly conveyer.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A to 2D are end on views of a sequence of inversion a chassis inverter made in accordance with this invention;

FIG. 4 is a side view of an indexing trolley for the chassis inverter of FIG. 2;

FIG. 5 is a front view of the indexing trolley for the chassis inverter of FIG. 2.

DETAILED DESCRIPTION OF THE INVENTION

Figure 1:
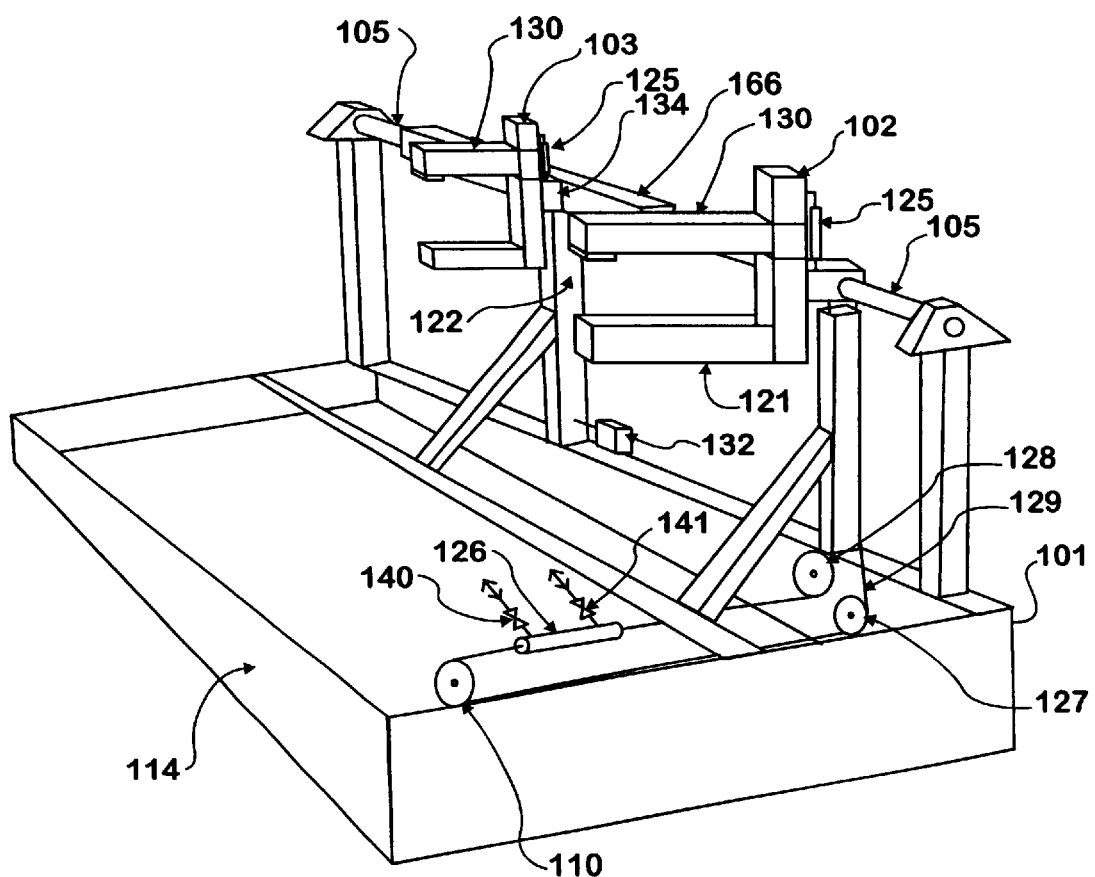
FIG. 1 is a perspective view of a chassis inverter made in accordance with this invention.
Figure 3:
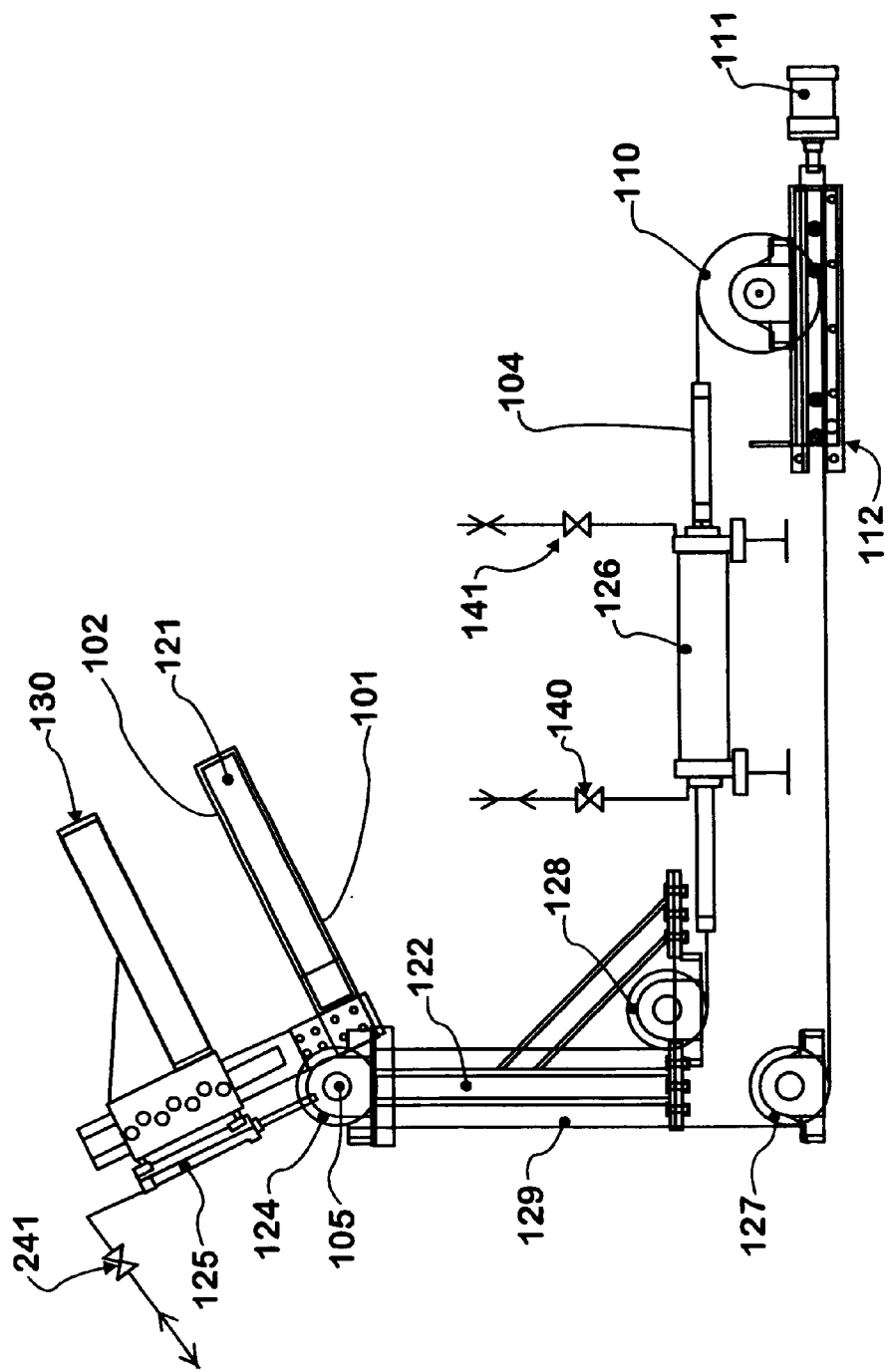
FIG. 3 is a side view of the chassis inverter of FIG. 2.

A chassis inverter 101 consisting of a set of clamps 102 and 103 that hold a mobile vehicle chassis 301 and a hydraulic driven rotary actuator 104 is shown in FIGS. 1 to 5. The inverter 101 consists of two c-shaped clamps, a stationary clamp 102 and variable axial location clamp 103 that may cradle the chassis 301. The clamps 102 and 103 are assembled to a shaft 105 that is driven by a hydraulic cylinder 126 through a sprocket and chain rotary actuator arrangement 104 that provides a full 180-degree rotation of the chassis. The variable axial clamp 103 has a motorized indexing trolley 132 that provides adjustment needed for handling chassis 301 of widely varying wheelbase. The wheelbase of the chassis 301 being the distance between the axles 303.

The chassis 301 is cradled in the two c-shaped clamps 102 and 103 that have hydraulic cylinders 125 to hold the chassis frame by closing on the flanges of the chassis' frame rails 302 with a stationary jaw 121 and a movable jaw 130. The c-clamp assemblies 102 and 103 are mounted to a rotatable shaft 105 that is supported in bearings on pedestals 122. The shaft 105 has a rotate sprocket 124 that connects a roller chain 129 to three idler sprockets 110, 127, and 128 and to the hydraulic cylinder 126 that powers the rotation of the roller chain 129 and hence the shaft 105. The sprockets 110, 127, and 128 and the roller chain 129 redirect the cylinder's 126 force from a linear to a rotary direction. This arrangement provides the large torque needed to rotate the shaft 105 under load. The idler sprocket 110 may have roller chain tension cylinder to maintain tension on the roller chain 129 allowing the idler sprocket 110 to move within a idler sprocket slide assembly 112. The hydraulic cylinder 126 is fitted with speed regulating valves 140 and 141 that provide a smooth turn over even when the chassis' center of gravity moves through the vertical position and the load attempts to run down hill. The speed regulating valves 140 and 141 are of the type that combines a check valve and a needle valve in one piece. The valves 140 and 141 function by metering the hydraulic fluid when it exits the cylinder. The inverter apparatus 101 may be built as individual components or to a base frame 114.

The inverting apparatus 101 may have one indexing trolley 132 that allows one of the c-clamps, the variable axial c-clamp 103 to be moved and thereby accommodate vehicle chassis that have a widely varying wheelbase. The indexing trolley 132 is supported in bearings 151 on a pedestal 131 so it can traverse. The pedestal 131 moves on two parallel runways 137 that are situated to provide reaction to the forces that are trying to push the pedestal 132 down and topple it over. The pedestal may have diagonal support beams 161. The pedestal trolleys 132 are the type having wheels that capture the runway 137 flanges from both above and below, as well as a side roller that runs on the edge of the runway flange. This total capturing of the runway 137 enables the pedestal's 132 reaction forces to be applied to the runways 137 for forces acting in vertical as well as the horizontal direction.

The section of the rotatable shaft 105 traversed by the indexing trolley is a square shaft 166. See FIG. 4. A square coupling box 134 fitted with indexing wheels 135 on all four sides, travels along the square section 166 of the rotatable shaft 105. These indexing wheels 135 are attached on the outside of the coupling box 134 so they can protrude through holes on the face of the coupling box 134 and run against the surface of the square shaft 166 of the rotatable shaft 105. This coupling box 134 and its corresponding axial location c-clamp 103 are rigidly attached together. The coupling box 134 thereby couples the clamp 103 to the rotatable shaft 105. The coupling box 134 is supported in bearings 139 by its pedestal 131. These bearings 139 allow the axial location c-clamp 103 and coupling box 103 to rotate. This combination of square rotatable shaft 16 and coupling box 134 allow the indexing trolley 132 to travel along the shaft 105 and also to couple the torque needed to rotate the c-clamp 103. The indexing trolley 132 can therefore be positioned anywhere along the length of the square shaft 166. A rolling pedestal 131 may be used to move the bearing supports 133 for the coupling box 134.

The chassis inverting apparatus 101 is loaded with a chassis 301 using a bridge crane 319. When the vehicle chassis 301 is placed in the clamps 102 and 103 and their corresponding clamp cylinders 125 close the jaws 121 and 130 on two generally parallel frame rails 302 of the chassis 301, the rotation cylinder 126 is driven through its stroke, and the chassis 301 is thereby turned over. The hydraulic cylinders 125 that operate the c-clamps 102 and 103 are then actuated to open jaws 121 and 130. In the unloading position, the clamps 102 and 103 are positioned to lower the chassis 301 when opened. The clamp cylinders 125 are also provided with speed regulating valves 241 (of the same type as previously described) that control the decent of the clamps 102 and 103 and vehicle chassis 301. The chassis 301 then in an upright position and ready to be unloaded with the bridge crane 319.

Figure 6:
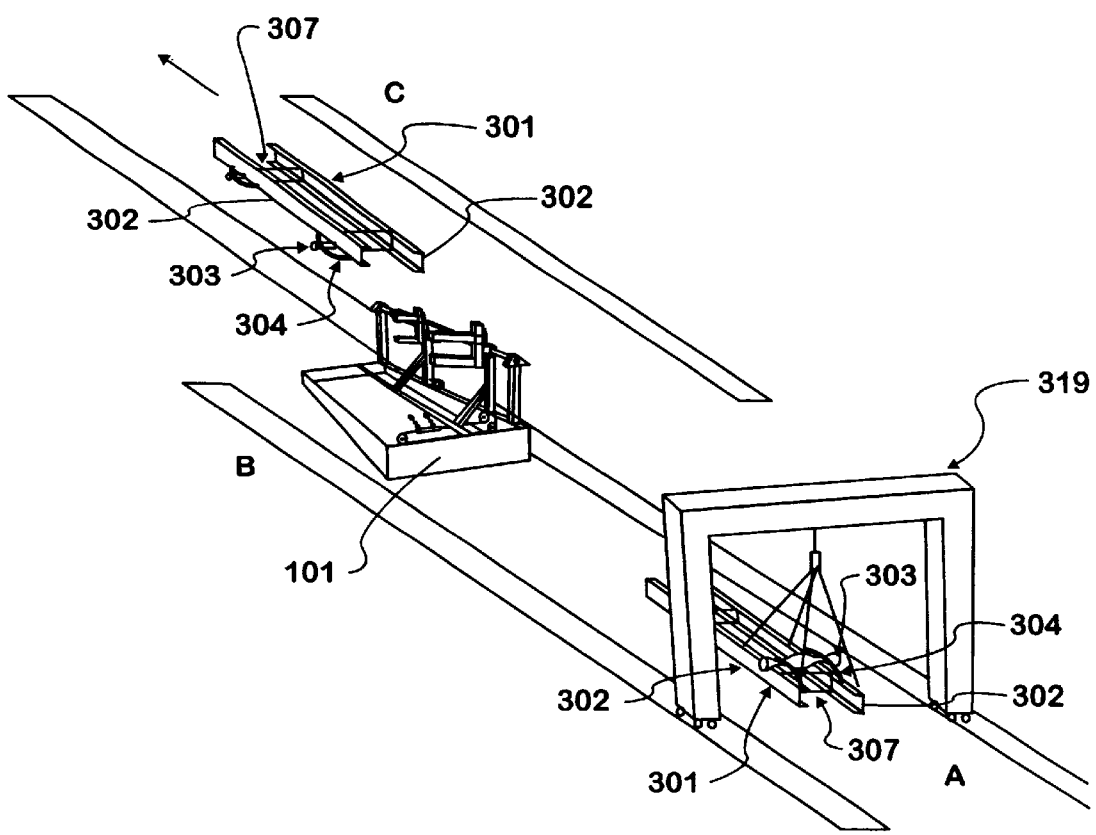
FIG. 6 is a perspective view of a vehicle assembly line using the chassis inverter of FIG. 1.

In one embodiment of the process using the inverter apparatus 101, as shown in FIG. 6, the chassis 101 is assembled in an upside down position in area A. The two frame rails 302 are aligned with bottom sides upwards and are engaged with cross members 307 between. A vehicle suspension system 304 is used to engage axles 303. The crane 319 moves the upside down chassis 301 to the inverter 101 in area B where as described above, the chassis 301 is inverted to right side up. The axles 303 and suspension 304 being underneath the frame rails 302 as the chassis 301 is unloaded to area C where it is moved on for further assembly.

As described above, the chassis inverter 101 the process for using the inverter 101 to assemble a vehicle chassis 301 provide a number of advantages, some of which have been described above and others of which are inherent in the invention. Also modifications may be proposed to the chassis inverter 101 and the process for using the inverter 101 to assemble a vehicle chassis without departing from the teachings herein.

We claim:

1. A process for assembling a chassis for a mobile vehicle, comprising the steps of:
    aligning a pair of frame rails with bottom sides upwards and engaging cross members between the frame rails;
    engaging chassis underside components to said frame rails to form an incomplete chassis;
    moving the chassis in the upside down condition to a chassis inverter, the chassis inverter comprised of:
        a rotatable shaft supported in bearings on pedestals;
        a set of c-clamps engaged to the shaft;
        the c-clamps for closing and cradling the frame rails of the chassis;
        a rotary actuator engaged to rotate the rotatable shaft to invert the chassis held in the c-clamps; and
        one of the c-clamps, a variable axial clamp adjustable in axial direction along the rotatable shaft to invert chassis' of variable wheelbases;
    adjusting the variable axial clamp for the wheelbase of the incomplete chassis;
    closing the c-clamps to engage the frame rails of the incomplete chassis;
    operating the chassis inverter to rotate the incomplete chassis approximately 180 degrees;
    opening the c-clamps to release the right side up chassis; and
    moving the incomplete chassis further on an assembly line for continued assembly.

2. A process for assembling a chassis for a mobile vehicle, comprising the steps of:
    aligning a pair of frame rails with bottom sides upwards and engaging cross members between the frame rails;
    engaging chassis underside components to said frame rails to form an incomplete chassis;
    moving the chassis in the upside down condition using an overhead crane to a chassis inverter, the chassis inverter comprised of:

a rotatable shaft supported in bearings on pedestals;
a set of c-clamps engaged to the shaft;
the c-clamps for closing and cradling the frame rails of the chassis;
a rotary actuator engaged to rotate the rotatable shaft to invert a chassis held in the c-clamps;
one of the c-clamps, a variable axial clamp adjustable in axial direction along the rotatable shaft to invert chassis' of variable wheelbases;
the rotary actuator drives the rotatable shaft with a hydraulic cylinder through a sprocket and chain arrangement allowing a full 180-degree rotation of the chassis;
the rotatable shaft having a square cross section where the variable axial clamp may be adjusted along the rotatable shaft;
the variable axial clamp has a motorized indexing trolley that moves the variable clamp along the rotatable shaft; and
the variable axial clamp having a coupling box with wheels for engaging against the square cross-sectional area of the rotatable shaft to provide torque coupling between the rotatable shaft and the variable axial clamp;
adjusting the variable axial clamp for the wheelbase of the incomplete chassis;
closing the c-clamps to engage the frame rails of the incomplete chassis;
operating the chassis inverter to rotate the incomplete chassis approximately 180 degrees;
opening the c-clamps to release the right side up chassis; and
moving the incomplete chassis further on an assembly line for continued assembly.

* * * * *